United States Patent
Quartier

(10) Patent No.: US 7,006,915 B2
(45) Date of Patent: Feb. 28, 2006

(54) RECORDING SYSTEM FOR VEHICLES WITH CPS

(75) Inventor: Frank Quartier, Kleve (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 10/822,552

(22) Filed: Apr. 9, 2004

(65) Prior Publication Data

US 2004/0260462 A1    Dec. 23, 2004

Related U.S. Application Data

(63) Continuation of application No. PCT/EP02/09090, filed on Aug. 21, 2002.

(30) Foreign Application Priority Data

Oct. 11, 2001    (DE)    ................... 101 49 991

(51) Int. Cl.
*G06C 21/00*    (2006.01)

(52) U.S. Cl. ............. 701/207; 701/213; 701/200; 342/357.06

(58) Field of Classification Search ............. 701/200, 701/207, 208, 213; 340/990; 342/357.04, 342/357.07, 357.08, 357.06

See application file for complete search history.

(56) References Cited

U.S. PATENT DOCUMENTS

| 5,155,688 | A | | 10/1992 | Tanaka et al. |
| 5,508,917 | A | * | 4/1996 | Siegle et al. ............... 701/207 |
| 5,710,702 | A | * | 1/1998 | Hayashi et al. ............. 701/1 |
| 5,717,389 | A | | 2/1998 | Mertens et al. |
| 5,933,100 | A | * | 8/1999 | Golding ................ 340/995.13 |
| 6,311,126 | B1 | | 10/2001 | Katayama et al. |
| 6,675,092 | B1 | | 1/2004 | Katayama et al. |

FOREIGN PATENT DOCUMENTS

| EP | 0730728 B1 | 9/1996 |
| EP | 08 02 509 B1 | 10/1997 |
| EP | 08 82 509 A2 | 12/1998 |
| EP | 1 006 340 A2 | 6/2000 |
| EP | 10 06 360 A2 | 6/2000 |

\* cited by examiner

*Primary Examiner*—Yonel Beaulieu
(74) *Attorney, Agent, or Firm*—Lawrence G. Fridman

(57) ABSTRACT

The invention relates to a detection system (84) and to a method for detecting vehicles (72) equipped with a position determination system (74), as they use certain routes (10). According to the invention, a vehicle transmits its received coordinate signal (78) to the detection system (84). Selected routes (10) of a digital route map (86) are divided into appropriate sectors (26, 28, 30, 32, 34). Each sector (26, 28, 30, 32, 34) is in turn divided into digital rectangular sectors (36, 38, 40, 42, 44) in such a way that the rectangular sectors (36, 38, 40, 42, 44) can be allocated to the coordinates of the respective vehicle (72) that has been detected.

10 Claims, 3 Drawing Sheets

RECORDING SYSTEM FOR VEHICLES WITH CPS

This application is a continuation of International patent application Ser. No. PCT/EP02/09090 filed Aug. 21, 2002 claiming priority of German patent application 101 49 991.4 filed Oct. 11, 2001.

TECHNICAL FIELD

The invention relates to a recording system for recording vehicles with a position determining system, for example a satellite navigation system or bearing taking system, when using roads, with the features:
(a) means for permitting a vehicle to transmit its received coordinate signal to the recording system,
(b) the recording system comprising a computer unit;
(c) a digital road map being stored in a memory of the computer unit
(d) selected roads of the road map being subdivided into appropriate sections;
(e) each section, in turn, being subdivided into digital rectangular segments;
(f) means for associating the coordinates of the respective detected vehicle with the rectangular segments;
(g) each section of the rectangular sections an appropriately selected length of the rectangular segments;
(h) the rectangular segments overlying the course of the road.

Furthermore, the invention relates to a method of recording vehicles with a position determining system, such as satellite navigation system (GPS), when using roads; with the following steps:
(a) transmitting the received coordinate signal to a recording system with a computer unit, the memory of which has stored therein a digital road map;
(b) subdividing selected roads of the road map into appropriate sections,
(c) subdividing each section, in turn, into digital rectangular segments,
(f) associating the coordinates of the respective detected vehicle with the rectangular segments;
(g) assigning to each section an appropriate length for the rectangular segments;
(h) superimposing the rectangular segments to the course of the road.

PRIOR ART

In some countries, fees are raised for the use of certain roads such as highways, large bridges or tunnels. Usually, these fees for using roads, also called toll, become due at certain points at toll stations, on highways, as a rule, at the exit. The procedure can be described briefly as follows: A user drives with his vehicle, at first, onto the highway at a highway entrance. There, he pulls a toll card from a toll station, which card indicates, where he has enter the highway. When exiting, the distance covered will be determined at a toll station at the exit, an a corresponding fee is collected.

In other countries, a vignette is sold to transit travellers at the border. Only the holder of such a vignette are allowed to use certain roads as, for example, highways.

Both methods have advantages and disadvantages. Raising toll by way of toll stations requires relatively much staff, as the toll has to be collected at the toll stations by human man power. The toll is, however, related to the actually covered distance. A further disadvantage of the collection of road using fees by means of toll stations is that, with heavy traffic, the toll stations are the starting points of traffic jams. Though the vignette solution does not require particularly much staff, as the vignette may be sold in any shop, it affects, however, all, also those who use the toll road only for a relatively short time. Such persons pay a very high price for the short-time use.

Another solution for the raising of toll are recording systems through radio, where the accounting can, as a rule, take place later. Such a recording system is known from the European patent 0 730 728. Here, the vehicles to be recorded have an equipment for receiving satellite navigation signals. Thereby, the instantaneous geographic position of the vehicle is determined. The respective coordinates are transmitted by radio to a computer device. A digital image of the road maps in vector representation is stored in the computer device. Some roads thereof are selected as subject to toll. These roads subject to toll are subdivided into individual sections. A plurality of appropriately long and rectangular segments are overlaid to each section, so that the whole respective section is covered. Depending on the course of the road, these segments have different lengths, the lengths of the segments of one section being always identical. In order not to make the number of the rectangular segments too large, the rectangular segments are wider than the road itself. Thereby, also relatively small curvatures are automatically covered without requiring breakdown of the section into still finer segments. This saves memory capacity and, in the end, also computing time, as not so many data have to be processed as with a very fine segment breakdown. By optimization, the appropriate segment length can be found for each section, such that the required memory capacity in the computer device can be kept low, As soon as the coordinates of a detected vehicle gets into such a segment, the toll falls due and is recorded. As soon as such a segment is left, no further toll will be collected.

This kind of section and segment formation suffers from a serious disadvantage. As soon as a road not subject to toll extends close enough to a road subject to toll, a vehicle on the toll-free road would suddenly get into the toll-ticketing. Therefore, these "critical areas" are, at present, exempt from the toll-ticketing. Thus, a section commences once in front and once behind this "critical area".

DISCLOSURE OF THE INVENTION

Therefore, it is an object of the invention, to eliminate the disadvantages of the prior art and to provide a system and a method, in which such "critical areas" are taken into account, when recording a vehicle. At the same time, the used memory capacity is to be optimally utilized.

According to the invention this object is achieved in that, with a recording system for recording vehicles with position determining system of the type mentioned in the beginning.
(i) for each section, a respective appropriately selected width of the rectangular segments is provided.

In addition, the object is achieved by a method of recording vehicles with a position determining system of the type mentioned in the beginning with the following step:
(j) assigning an appropriately selected width for the rectangular segments to each section.

Up to now, the roads which have been relevant for vehicle recording were stored as digital road maps in one or more computers. These digital road maps are provided, in particular, by commercial traders of geographic map material. In order not to have include each individual point of the course of the road into the computer—for reasons of memory capacity—the roads to be taken into account are subdivided in sections. Rectangular sectors or rectangular segments are, in turn overlaid to there sections. The rectangular segments have always the same size for each respective section. Up to now, they were dimensioned to have always the same width.

The invention is based on the principle to vary also the width of the rectangular segments for each section appropriately. Thereby, these rectangular segments can also be matched with critical areas. In the following, the term "critical areas" is to cover such areas of the digital road map, where at least two so close together that the area in which a vehicle is not to be recorded falls within the area to be recorded. Two roads stretching closely adjacent each other may form such a critical area, as, for example, a country road stretching immediately parallel to a highway, the highway being an area to be recorded and the country road being no such area. Only the vehicles on the highway are to be recorded. By varying the rectangular segments as to their width, this situation can be taken into account without utilizing much more memory capacity and computing time involved therewith. Nevertheless, the vehicle is recorded over the whole course of the road, while, in the prior art, these critical areas had to be spared for the recording.

It has been found to be a preferable modification of the invention, that the sections have different lengths. In this way, the system becomes very flexible and variable. The sections can be made to have a length that optimal utilization of the computer memory and, thereby, of the computing time involved therewith is ensured. Preferably, in the case of a highway, the sections to extend from exit to exit.

In a preferred embodiment of the recording system of the invention the selected roads are roads subject to toll, such as highways. In this way, the recording system can be used to monitor roads subject to toll. Each vehicle which used the monitored road is recorded by the system of the invention and has to pay the due toll.

When a vehicle enters the recording system, this system has to be activated. To this end, in an appropriate embodiment, means are provided for activating the recording of the vehicle not before the coordinate signal enters a rectangular segment. Analogously, the recording system has to be de-activated again. Preferably this is effected by appropriate means for de-activating the recording of the vehicle upon the coordinate signal leaving a rectangular segment.

In order to enable unambiguous allocation of vehicle and recorded coordinates, a preferred embodiment provides identifying means for transmitting an individual identifying signal (80) to the recording system (84) for unambiguous identification of a recorded vehicle. Thereby, it is established, unambiguously, to whom the recorded coordinates belong and who has to be charged with the fees for using the road.

Furthermore, in a preferred embodiment of the invention, means are provided for determining the entrance and/or exit angle at which a vehicle enters or leaves a rectangular segment. On the basis of the entrance or exit angle, respectively, an additional criterion is obtained, which permits recognition of whether a vehicle is in an area to be recorded or not. For example, in an intersection area, the vehicle usually does not move parallel to a road, if it only crosses this road. Thus this vehicle has a certain entrance or exit angle, respectively, relative to the area to be recorded. If the vehicle gets into the area to be recorded within a predetermined angular interval, this vehicle will be considered by the recording system as a crossing vehicle only.

Furthermore, in a preferred embodiment, there are means for optimizing or reducing, respectively, the data quantities, in particular of the road data, of the section data and of the data of the rectangular segments. These means may, for example comprise appropriate compression algorithms, whereby the data can be kept relatively compact.

In a further advantageous embodiment of the invention, the digital road maps are provided in the form of vector data. This ensures simple processing of the map data in the computer. An optional scale can be assumed for the digital maps without changing the basic information of the vector data and, thus, of the digital map.

Furthermore, means are provided for fixing a tolerance range within which activation and de-activation of the recording of the vehicle takes place. This is to prevent vehicles which must not yet be recorded which, however, reach the edge of the area to be recorded, from being taken into consideration with the recording. Here, it has been found advantageous, if a certain tolerance range for the activation and de-activation is fixed.

It has been found as an advantageous modification of the method of the invention, that an appropriately selected length is assigned to the sections, these length being possibly different. A further aspect of the method of the invention is, that toll roads are selected as relevant roads.

In an appropriate modification of the method, subdivision of the roads in sections is effected, in the case of highways or highway-like roads, from exit to exit. This facilitates the application of the method of the invention.

Preferably, with the method, recording of the vehicle is not activated before the coordinate signal enters a rectangular segment and is deactivated upon the coordinate signal leaving a rectangular segment. Thereby it can be avoided that the vehicle to be recorded is continuously observed. For the unambiguous allocation at the coordinates to a vehicle, according to a further advantageous modification, an identification signal for unambiguously identifying a recorded vehicle is transmitted to the recording system. As soon as the recorded coordinates are allocated to a vehicle, also the corresponding fees can be allocated to this vehicle.

Preferably, analogously to the recording system of the invention, also with the method of the invention, the entrance angle and/or the exit angle at which a vehicle enters or leaves respectively, a rectangular segment is determined.

In a preferred modification of the method, a data optimization or data reduction, respectively, in particular of the road data, the section data and the data of the rectangular segments takes place. This optimization can be effected by appropriate arrangement and the reduction of the data by data compression with compression algorithms.

Analogous to the modification of the recording system of the invention, also in the method of the invention, the data of the digital road map are stored in the memory of the computer unit as vector data. With vector data sets, no information can be lost due to enlargement or reduction of, for example, a map section.

Preferable, also with a modification of the method of the invention, a tolerance range is fixed in which activation an de-activation, respectively, of the recording of a vehicle is effected. This measure ensures that only those vehicles are recorded which actually are within the area to be recorded.

Further advantages result from the subject matter of the sub-claims.

PREFERRED EMBODIMENT

Figure 1:
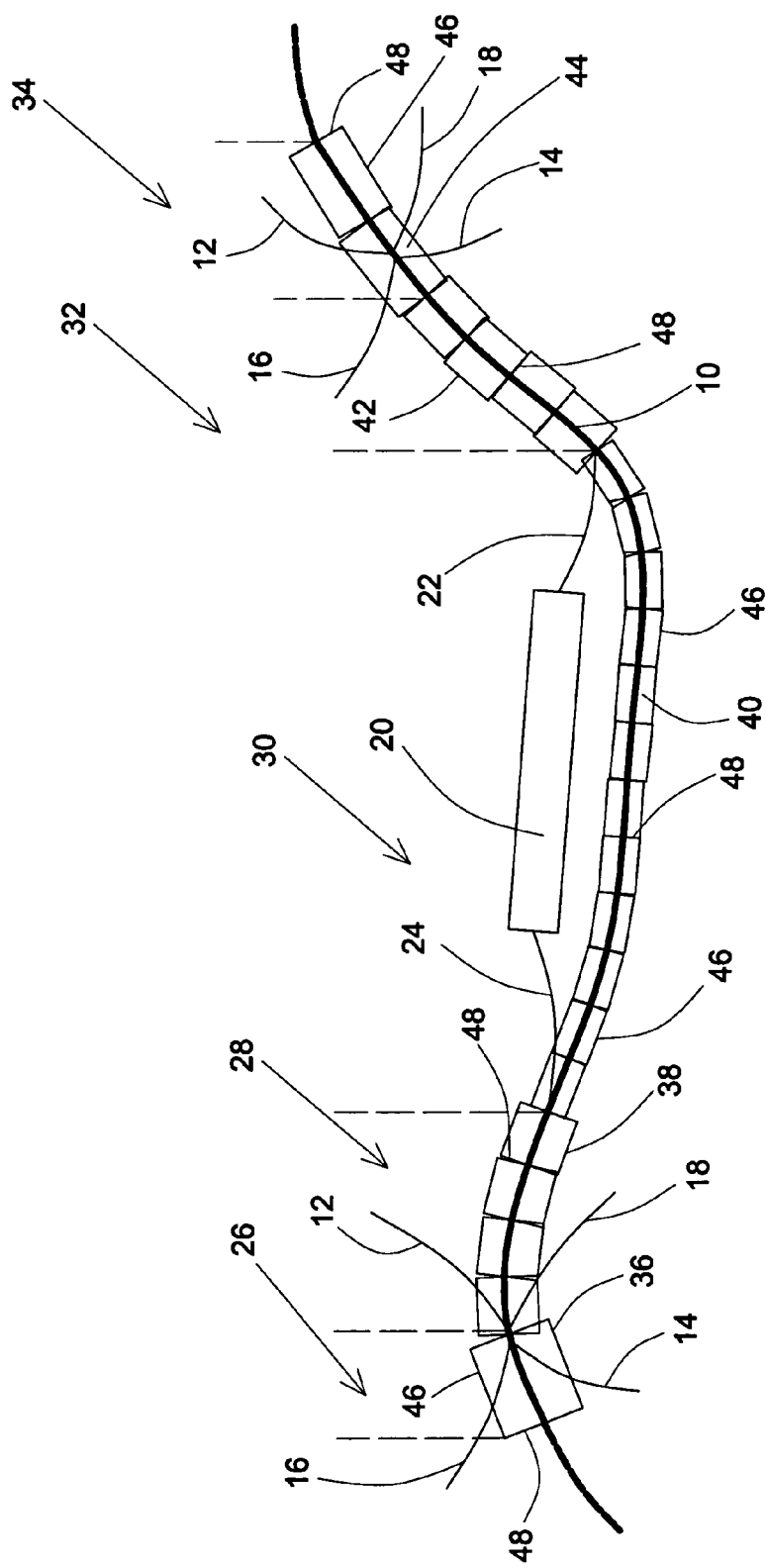
FIG. 1 is a principle sketch and shows section of a digital road map in vector representation with a highway subject to toll and a rest house not subject to toll.

FIG. 1 is a principle sketch and shows a section of road map in vector representation, as it is stored, for example, also in the memory of a computer unit of a recording system of the invention. Principally, a representation is called a vector representation, if the road map consists of nothing but coordinates which, for illustration, are merely interconnected by lines. The coordinates of the map are stored in look-up tables. Thus, sections of any size can be represented by appropriate coordinate transformation, without losing information by enlargement of reduction, as this would, for example, be the case with a pixel graphic.

A recording system of the invention serves, in particular, to detecting and recording those vehicle which use roads subject to toll. Other applications are, for example, the police observation of certain vehicles. At the same time such a recording system may serve as theft protection, as the position and the identification of the vehicle is continuously transmitted. Furthermore, such a recording system can, principally, also serve also, for example, for the traffic monitoring and/or traffic control. By evaluating the recorded data, variable speed limit signs can be controlled, in order to prevent traffic jams with high traffic density.

Vehicles of the present embodiment of FIG. 1 are equipped with a satellite navigation system (GPS="Global Positioning System"). The coordinates of the instantaneous position of the vehicle are determined through the satellite navigation system. Such vehicles are able, for example through radio, to continuously transmit the coordinates of their positions to the recording system. In addition to the coordinate signals, the vehicles have, however, also to transmit identification signals, by which the vehicle can be unambiguously identified by the recording system. The recording system has an appropriate receiver and processing device for receiving and processing the coordinate and identification signals. The processing device consists of one or more computers, which may be networked with each other. The digital map material is stored in the memories of the computers, which, among others, is provided by commercial traders. Thus, FIG. 1 illustrates quasi a digital image of a map section.

Referring to FIG. 1, numeral 10 designates a highway subject to toll, which is illustrated as a winding line. Entrances 12 and 14 lead to the highway 10. Exits 16, 18 lead away from the highway 10. Furthermore, a rest house 20 lies at the highway, to which an exit 22 from the highway 10 leads. A vehicle gets back to the highway from the rest house through an entrance 24. While the highway 10 is an area subject to toll, the rest house is a toll-fee area. The highway is subdivided into appropriate sections 26, 28, 30, 32, and 34. The sections 26, 28, 30, 32, 34 of the highway 10 are indicated by dashed lines. In these sections 26, 28, 30, 32, 34, also called sections, rectangular segments 36, 38, 40, 42, and 44 are overlaid over the course of the highway 10.

The rectangular segments 36, 38, 40, 42, 44 of each section 26, 28, 30, 32, 34 are dimensioned differently both with regard to their lengths and with regard to their widths, this being done in such a way that they fit appropriately into the sections 26, 28, 30, 32, 34. To this end, they are dimensioned with regard to their lengths 46 and widths 48, for each respective section, such that as few as possible rectangular segments 36, 38, 40, 42, 44 are used, so that as little memory capacity of the computer is consumed. However, the rectangular segments 36, 38, 40, 42, 44 of each section 26, 28, 30, 32, 34 are always of the same size.

As with too wide rectangular segments 48 easily areas may be covered which no longer belong to the sections 30 subject to toll—in the present embodiment, for example, the rest house 20—the rectangular segments 48 have to be dimensioned rather narrow (i.e. small width 48), to prevent the rectangular segments 48 from overlapping also this area. The rectangular segments 26, 28, 32, 34 of other sections can, however, be dimensioned considerable wider.

As soon as the coordinates of a vehicle transmitted to the recording system reach such a rectangular segment 36, 38, 40, 42, 44 road using fees become de. The toll recording is activated thereby. Not before a rectangular segment 36, 38, 40, 42, 44 is left, the toll recording is de-activated. On the basis of the identification signal which is transmitted by the vehicle, the toll for the driven distance on the highway subject to toll can now unambiguously computed for the vehicle.

Figure 2:
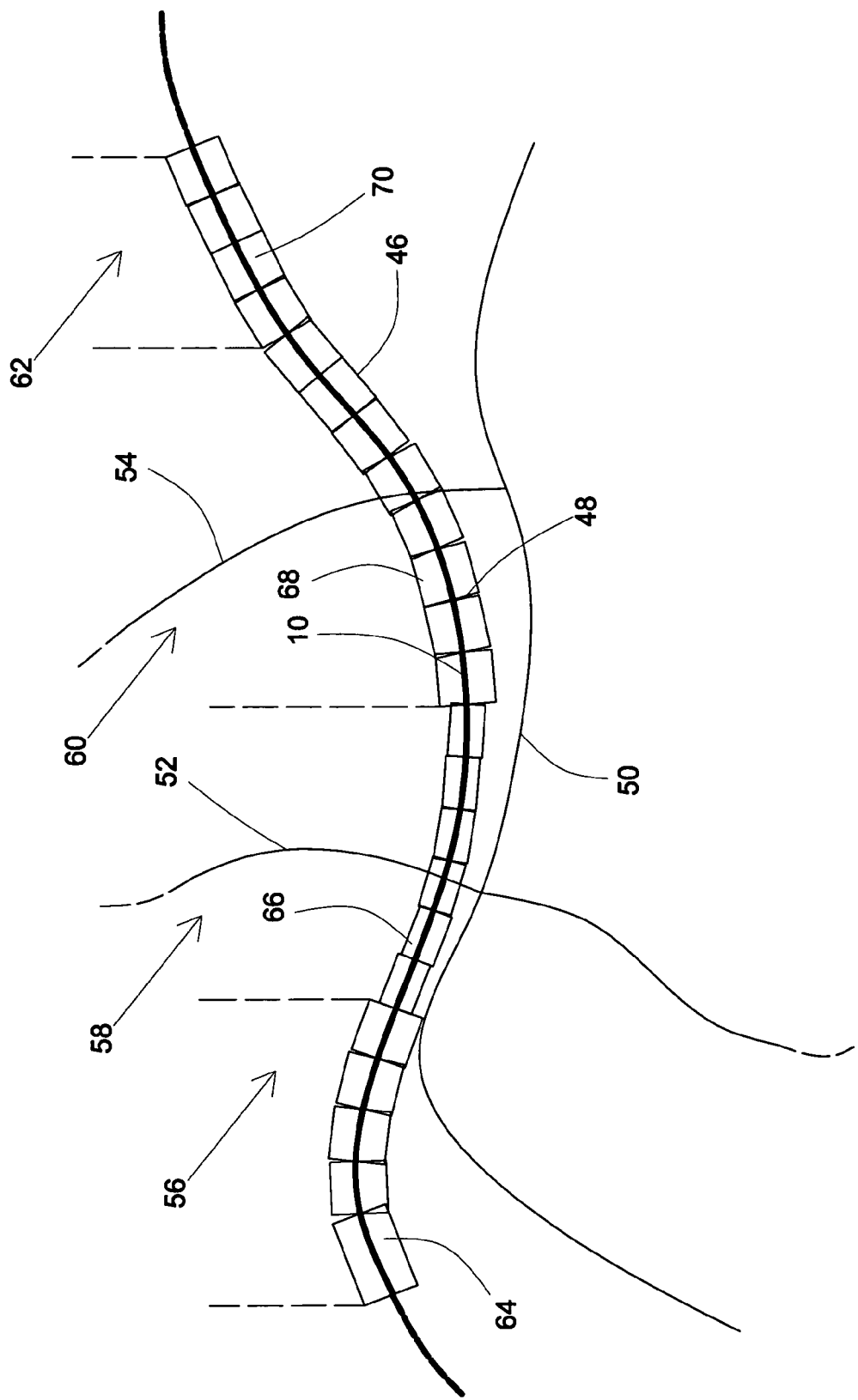
FIG. 2 is a principle sketch and shows a section of a digital road map in vector representation with a highway subject to toll and a toll-free country road.

FIG. 2 illustrates a similar situation as FIG. 1. The thick winding line is the highway 10 subject to toll. Instead of the rest house 20, a number of county roads 50, 52, 54 are illustrated as toll-free areas. The country road 50 is located, at least in partial areas, very close to the highway 10. The country roads 52, 54 cross the highway 10. The highway 10 subject to toll is subdivided into sections 56, 58, 60, 62. Analogously to FIG. 1, each of these sections 56, 58, 60, 62 has individual rectangular segments 64, 66, 68, 70 having appropriate lengths 46 and 48. In the area of section 58, the rectangular segments 66 are very narrow, in order not to overlap the country road 50. The country road 50 namely extends very closely adjacent to the highway 10. Otherwise, toll night be collected for a vehicle which drives along the country road 50. The toll recording is effected in the same way as described above with reference to FIG. 1.

As vehicles which drive along the country roads 52 or 54, respectively, necessarily cross The highway 10 subject to toll, toll would have to be collected for these vehicles, as they get into the area of the highway 10 subjected to toll and activate this area though for a short time only. In order to avoid this unjustified toll collection, such vehicles which enter the area subject to toll at a nearly right angle, are exempt from the recordal. If necessary, also the time of stay within the area subject to toll can be used as a criterion. If a vehicle stays in the area subject to toll for a short time only, it will be example from toll recordal.

Figure 3:
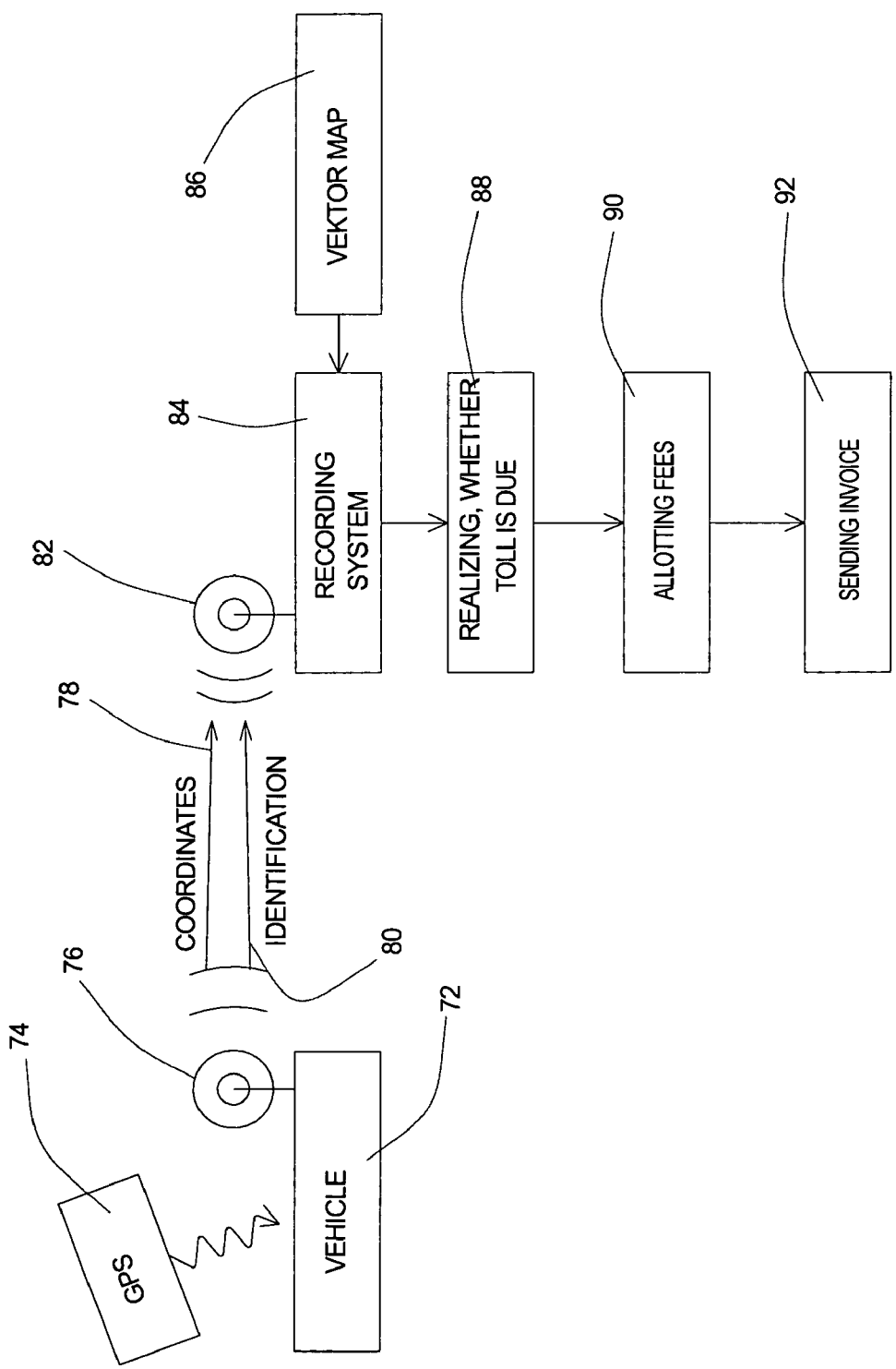
FIG. 3 illustrates the mode of operation of a recording system of the invention.

Referring to FIG. 3, the general mode of operation of the recording system of the invention and of the method for the recording of vehicles is to be explained briefly, as already indicated further above. A vehicle 72 receives, from a satellite navigation system, data about to its exact position. Through radio, the vehicle 72 transmits the position coordinates, arrow 78, and an individual identification signal, arrow 80. These position coordinate 78 and the identification signal are received by a receiver device 82 of a recording system 84. In the recording system it will be determined on the basis of a geographic map in vector representation (as described with reference to FIG. 1 and FIG. 2) whether toll is due for the instantaneous position of the vehicle 72, box 88. If toll is due, road using fees are allotted to the account of the vehicle which has been identified be the identification signal 80, box 90. Subsequently, automatically an invoice can be sent to the holder of the vehicle, box 92.

What is claimed is:

1. A system for recording a vehicle, when using selected roads, comprising:

recording means, said recording means comprising a computer unit, said computer unit comprising a road map memory for storing in digital form a road map data representing selected roads and other roads and areas, so that vehicles on said selected roads being recorded in said road map memory and vehicles on said other roads and areas are not being recorded;

position determining means for determining position of said vehicles and for providing vehicle coordinate signals representing said vehicle coordinates referenced to said road map data;

means on said vehicles for transmitting said coordinate signals to said recording means;

said stored road map data further comprising digital information representing substantially rectangular segments overlying said selected roads represented by said road map data and having lengths oriented substantially in the direction of said selected roads and widths substantially transverse to the directions of said selected roads;

said widths being variable along said selected roads so as to exclude from said segments said other roads and areas in which said vehicles are not being recorded;

means for activating recording of said vehicles preventing said activation before the coordinates represented by said coordinate signal enter one of said substantially rectangular digital segment; and means for de-activating recording of said vehicles upon said coordinates represented by said coordinate signal leaving said substantially rectangular digital segment.

2. A system as claimed in claim 1, wherein said stored road map data comprises information for subdividing said selected roads into sections, in each said section said digital substantially rectangular segment have the same lengths and widths, while the lengths and widths of different sections can vary.

3. A system as claimed in claim 1, wherein said position determining means comprise a satellite navigation system.

4. A system as claimed in claim 1, wherein said position determining means comprise a bearing-taking system.

5. A system as claimed in claim 1, further comprising means in said vehicles for transmitting an identifying signal for unambiguous identification of said vehicles.

6. A system as claimed in claim 1, further comprising means in said vehicle for transmitting an identifying signal for unambiguous identification of said vehicles, said recording means comprising means for computing toll from the distance of which said vehicle was recorded on said selected roads, and means for associating said computed toll with said identified vehicles.

7. A system as claimed in claim 1, further comprising means for fixing a tolerance range within which activation and de-activation of the recording of said vehicles take place.

8. A system as claimed in claim 1, wherein said digital road map data is provided in the form of a vector data.

9. A method of recording a vehicle when using selected roads comprising the steps of:

storing a road map data representing selected roads and other roads and areas in a digital form in a road map memory of a computer unit, so that vehicles on said selected roads are being recorded and vehicles on said other roads and areas are not being recorded;

determining a position of said vehicles to provide vehicle coordinate signals representing vehicle coordinates referenced to said road map data;

transmitting said coordinate signals from said vehicles to said computer unit;

storing in said road map memory digital information representing substantially rectangular segments overlying said selected roads represented by said road map data and having lengths oriented substantially in the direction of said selected roads and widths oriented substantially transverse to the direction of said selected roads, said widths being variable along said selected roads, so as to exclude from said segments said other roads and areas in which said vehicles are not being recorded;

activating recording of said vehicles substantially after the coordinates represented by said coordinate signals enter one of said digital substantially rectangular segments; and de-activating recording of said vehicles upon said coordinates represented by said coordinate signals leaving said digital substantially rectangular segments.

10. A method as claimed in claim 9, further comprising the step of transmitting from said vehicle an identifying signal for unambiguous identification of said vehicle.

* * * * *